W. D. JONES & J. G. GRIMLEY.
LOCK FOR AUTOMOBILES.
APPLICATION FILED MAR. 3, 1914. RENEWED JUNE 17, 1915.
1,159,041.
Patented Nov. 2, 1915.
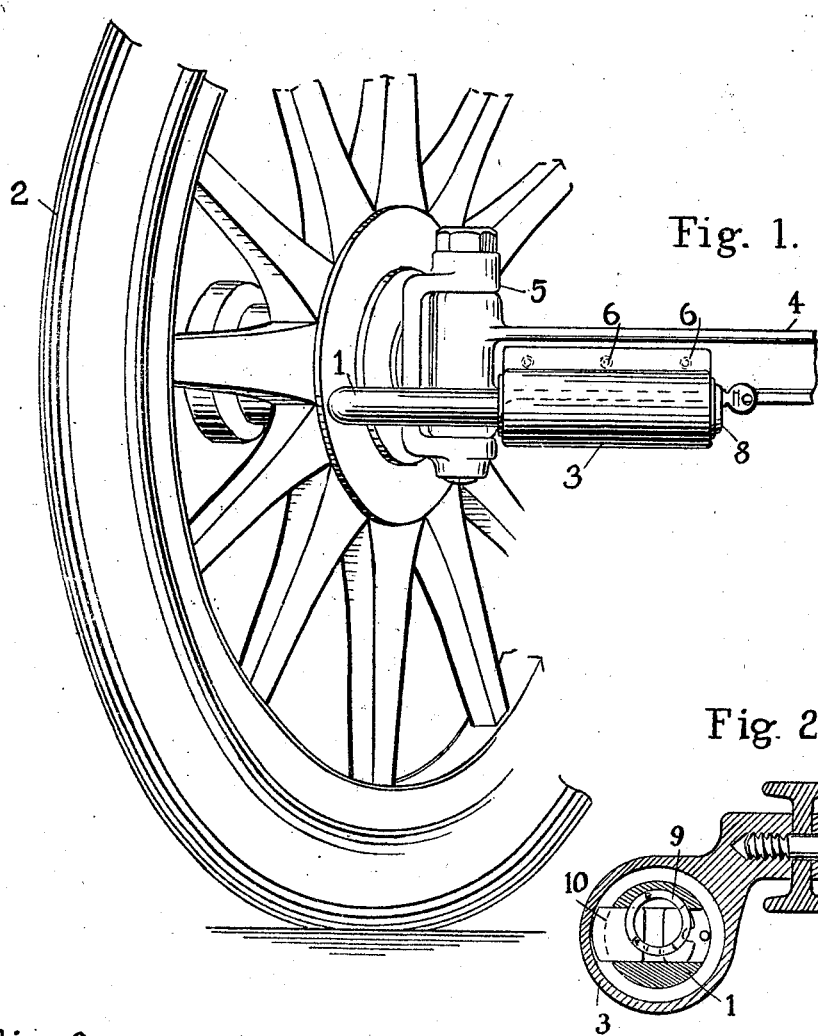
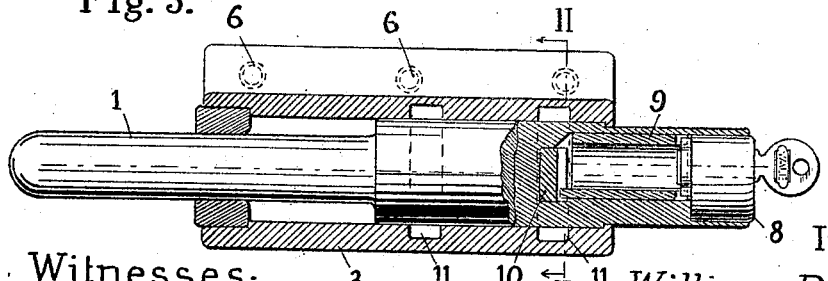
Inventors,
William D. Jones,
John G. Grimley,

UNITED STATES PATENT OFFICE.

WILLIAM D. JONES AND JOHN G. GRIMLEY, OF NEW YORK, N. Y.; SAID JONES ASSIGNOR TO I. NEWTON WILLIAMS, OF NEW YORK, N. Y.

LOCK FOR AUTOMOBILES.

1,159,041.  Specification of Letters Patent.  Patented Nov. 2, 1915.

Application filed March 3, 1914, Serial No. 822,242. Renewed June 17, 1915. Serial No. 34,737.

*To all whom it may concern:*

Be it known that we, WILLIAM D. JONES and JOHN G. GRIMLEY, both citizens of the United States of America, and residents of the city of New York, borough of Manhattan, in the county of New York and State of New York, have invented certain new and useful Improvements in Locks for Automobiles, of which the following is a specification.

The object of this invention is to provide a device of a substantial character which will hold an automobile in a condition in which it cannot be stolen and removed either by its own power or by towing from a public place in which it may be temporarily left standing.

A further object is to provide a lock which may be attached to an automobile with such security that it cannot be removed by any tools available for use in a public place, within such period of time as one may need to leave an automobile unguarded, and which cannot be destroyed without application of such force as would also destroy such vital parts of the automobile as would prevent driving or towing of the automobile.

In the accompanying sheet of drawings which forms a part of this application—Figure 1 is a front elevation showing an axle with a device embodying our invention applied thereto in connection with a running wheel in a deflected position, Fig. 2 is a section on the line II—II of Fig. 3, Fig. 3 is a front elevation of the device with the sleeve in section and the barrier broken away to show the lock mechanism.

The device as shown comprises a sliding barrier 1 which in operative position is in direct contact with the running wheel 2 and prevents it from being turned from a deflected position. The barrier is carried by a sleeve 3, the sleeve being rigidly attached to the middle section 4 of the front axle of the automobile adjoining the steering knuckle 5. The attachment of the sleeve to the axle is by means of stud bolts or rivets 6 6 which are screwed into a rib on the side of the sleeve and pass through the web of the axle and counter-sunk holes in a bar 7. The heads are upset into the counter-sunk holes and left flush so that removal is possible only with more facilities than are ordinarily available outside of a shop or could be used in a public place without attracting attention and consuming more time than a thief would have in which to complete the job.

A cylindrical tumbler lock 8 of well known design is set into the rear end of the sliding barrier and operating through a hollow shaft 9 throws a bolt 10 which lies in a slot across the barrier. Two interior grooves 11-11 are turned in the bore of the sleeve, and the bolt locks in one of these when the barrier is in operative position and in the other when the barrier is in its retracted position. The protruding end of the barrier is case-hardened so that it cannot be cut and is of such size that an attempt to bend or break it with a sledge would only result in the breaking of the axle, and so leave the automobile in as bad condition for driving or towing away as when the wheel is held in deflected position.

What we claim as new, and desire to secure by Letters Patent of the United States, is—

1. In an automobile the combination of a running wheel, an axle and steering knuckle therefor, a barrier for holding the running wheel in a deflected position, a support for the barrier mounted on the axle, and a lock for securing the barrier in its operative position, substantially as described.

2. In an automobile the combination of a running wheel, an axle and steering knuckle therefor, a sliding barrier for holding the running wheel in a deflected position, a sleeve for carrying the barrier mounted on the axle, and a lock for securing the barrier against longitudinal movement in the sleeve when in operative position, substantially as described.

3. In an automobile the combination of a running wheel, an axle and steering knuckle therefor, a sliding barrier for holding the running wheel by direct contact therewith in a deflected position, a sleeve for carrying the barrier mounted on the axle, and a lock for securing the barrier against longitudinal movement in the sleeve when in operative position, substantially as described.

Signed by us at New York, N. Y., this 28th day of February, 1914.

WILLIAM D. JONES.
JOHN G. GRIMLEY.

Witnesses to both signatures:
SAMUEL W. BALCH,
WARD WASSON.